March 10, 1925.  1,529,061
J. W. GORDON
TRANSMISSION MECHANISM FOR AUTOMOBILES
Filed Aug. 21, 1922   2 Sheets-Sheet 1
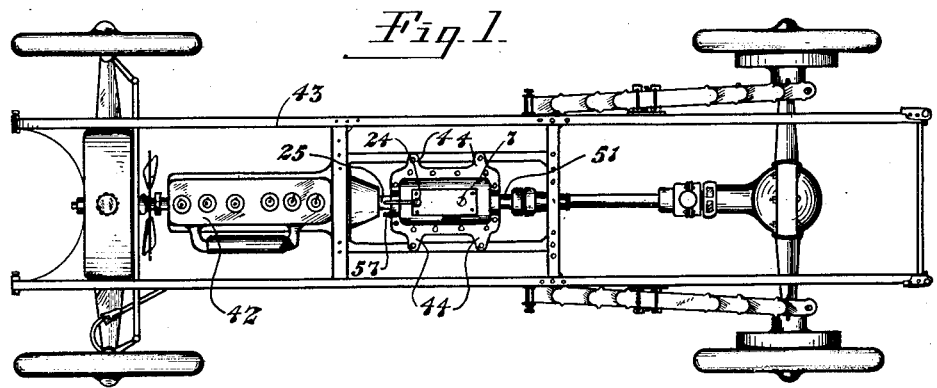
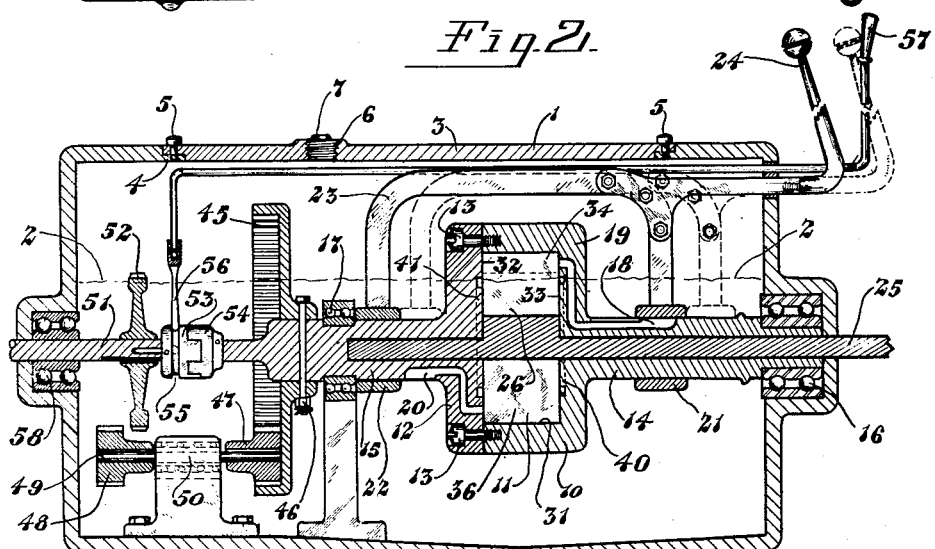
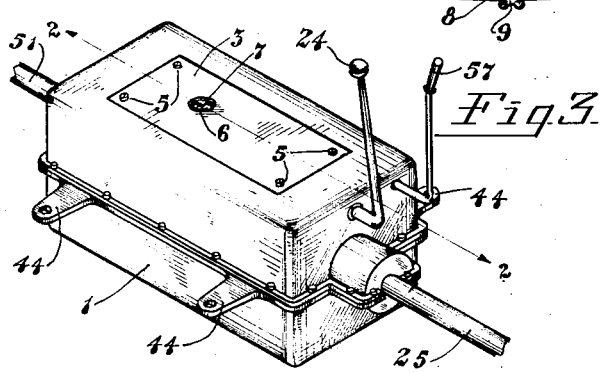
INVENTOR
JOHN W. GORDON
BY *James N. Ramsey*
ATTORNEY March 10, 1925. 1,529,061
J. W. GORDON
TRANSMISSION MECHANISM FOR AUTOMOBILES
Filed Aug. 21, 1922 2 Sheets-Sheet 2
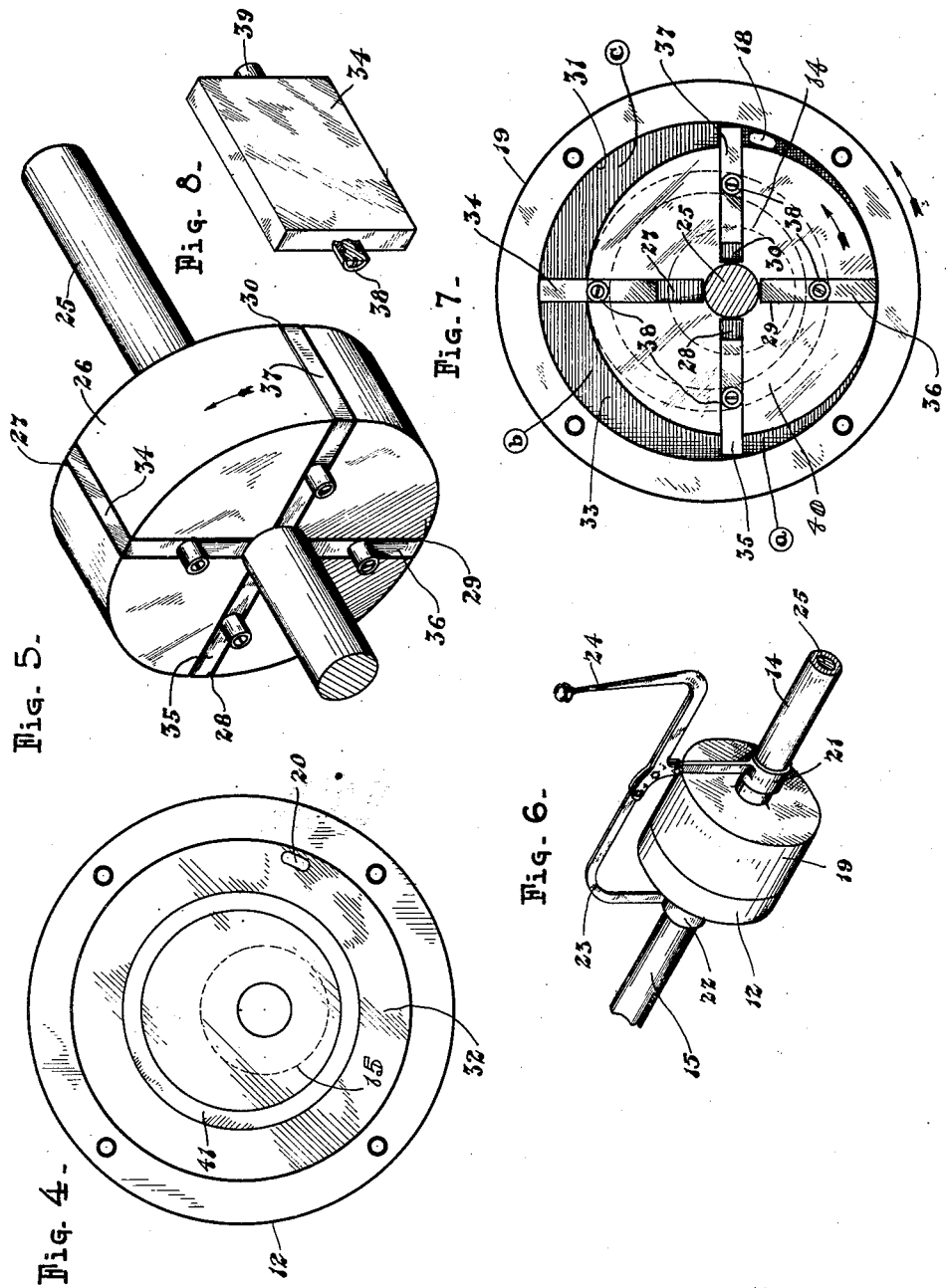
INVENTOR
JOHN W. GORDON
ATTORNEY Patented Mar. 10, 1925.

1,529,061

UNITED STATES PATENT OFFICE.

JOHN W. GORDON, OF DAYTON, OHIO.

TRANSMISSION MECHANISM FOR AUTOMOBILES.

Application filed August 21, 1922. Serial No. 583,230.

*To all whom it may concern:*

Be it known that I, JOHN W. GORDON, a citizen of the United States, residing at Dayton, in the county of Montgomery and State of Ohio, have invented certain new and useful Improvements in Transmission Mechanism for Automobiles, of which the following is a specification.

My invention relates to simple, convenient, efficient and economical means for transmitting power from the engine or motor driven shaft to the propeller shaft at varying rates of speed, as desired.

The objects of my invention are to provide means whereby the power is transmitted from the motor driven shaft to the propeller shaft for forward movement without the use of gears; to provide efficient means for transmitting such power at varying rates of speed from the minimum to the maximum and vice versa without the intervention of a clutch and without danger of any sudden jarring effect of the mechanism and, there being no gears, without stripping of gears and necessity of shifting gears, particularly in slow traffic; to provide mechanism of great flexibility which is noiseless in operation; to provide for thorough lubrication of the parts, and to provide an oil cushion to relieve the mechanism from any sudden jars or jerks.

An advantage of my improved transmission is that it avoids the necessity of shifting gears for the forward motion of the car, and by its throttling mechanism the speed of the car can be varied from minimum to maximum by a steady acceleration by simply moving the throttle without altering the speed of the engine; that is, the engine may be run rapidly and the car gradually accelerated until the propeller shaft attains the same speed as the engine shaft which corresponds to the high speed in the ordinary transmission. The apparatus works in an oil bath and is self lubricating. Also by reason of its running freely the oil cushion prevents the back lash of the propeller shaft against the engine motor. My improved transmission takes the place of the fly wheel, the clutch and the transmission gears on the ordinary automobile as it is now constructed.

My invention consists in the combination and arrangement of parts and in the details of construction as herein set forth and claimed.

In the drawings:

Fig. 1 is a plan view of an automobile chassis embodying my invention;

Fig. 2 is a vertical longitudinal section of my invention taken on the line 2—2 of Fig. 3 and showing ports 18 and 20 displaced into the vertical plane to clearly show the route of the fluid;

Fig. 3 is a perspective view thereof;

Fig. 4 is an interior face view of the removable head of the rotary cylindrical piston housing;

Fig. 5 is a perspective view of the cylindrical piston hub and motor driven shaft;

Fig. 6 is a perspective view of the rotary cylindrical piston housing and hand throttling lever;

Fig. 7 is an interior face view of the rotary piston chamber, piston hub, pistons and motor driven shaft; and Fig. 8 is a perspective view of one of the piston plates.

In the embodiment of my invention as illustrated and which shows a preferred construction I provide means whereby power is transmitted from the motor driven shaft to the propeller shaft for the forward movement of the car without the use of transmission gears or foot clutch, such as now used on automobiles. To accomplish this I provide case 1 adapted to contain oil to line 2 or higher if desired. In order to gain access to the interior of the case it is provided in its top with a suitable flanged cover 3 which preferably rests upon flange 4 and is removably secured by screws 5. It is provided with threaded filling opening 6 adapted to be closed by screw plug 7. A suitable drain outlet 8 is provided in the bottom of said case and is closed by screw plug 9.

A rotatable cylindrical piston casing 10 having cylindrical piston chamber 11 therein is provided with removable head 12 secured thereon by screws 13. Said piston casing is rotatably supported and mounted on integrally formed hollow spindles 14 and 15 journaled in ball bearings 16 and 17 respectively. Inlet port 18 extends through spindle 14 and casing head 19 into piston chamber 11 and outlet port 20 extends through hollow spindle 15 and removable head 12 into said chamber. Sleeves 21 and 22 connected by yoke 23 are slidably mounted upon spindles 14 and 15 respectively, and are adapted to be moved thereon by speed lever 24 attached to said yoke to simultaneously open and close ports 18 and 20 respectively, as indicated by dotted lines in Fig. 2.

Motor driven shaft 25 is rotatably mounted in said hollow spindles and has formed thereon cylindrical piston hub 26 provided with radially disposed piston slots 27, 28, 29 and 30. Said cylindrical piston hub is eccentrically mounted in piston chamber 11 in such a manner that a portion of its periphery always bears against the inner face of cylindrical wall 31 of said chamber, as shown in Fig. 7. Said hub fits snugly between the inner end faces 32 and 33 of said cylindrical casing and is provided with a plurality of piston plates 34, 35, 36 and 37 respectively, which are slidably mounted in said slots respectively. Said piston plates are forced outwardly into constant contact with cylindrical wall 31 of chamber 11 by means of rollers 38 and 39 respectively, mounted on each end of said piston plates respectively, (Figs. 5 and 8) said rollers operating in grooves 40 and 41 respectively, as clearly shown in Figs. 2 and 7, the rotary movement of cylindrical piston hub 26 causing said pistons to move inwardly when they approach the point where the periphery of said hub bears against cylindrical wall 31 of piston chamber 11. Said pistons are forced outwardly in said slots to maintain them in continuous contact with said wall when they move away from said point. Power is applied to motor driven shaft 25 by engine 42 and the case 1 is preferably secured to the chassis 43 by ears 44.

The reversing mechanism comprises internal gear 45 fixed upon spindle 15 by bolt 46 or other suitable means. Spur gear 47 in constant mesh with internal gear 45 and spur gear 48 are fixed upon common shaft 49 in bearing 50. Propeller shaft 51 suitably mounted in ball bearing 58 has clutch gear 52 slidably splined thereon and is provided on its end with slidably splined clutch member 53 adapted to engage clutch member 54 fixed upon the end of spindle 15. Clutch member 53 is provided with circumferential groove 55 slidably engaged by actuating finger 56 of reverse lever 57.

In the construction clearly indicated by full lines in Fig. 2 inlet port 18 being closed by sleeve 21 allows piston hub 26 and piston plates 27, 28, 29 and 30 respectively, to rotate with motor driven shaft 25 without affecting propeller shaft 51, since any oil in the piston chamber will be discharged through outlet 20. This action is gradual due to the fact that the wedging action of the oil between the piston plates and walls of the piston chamber takes place slowly as one port is being opened while the other port is being closed, thus allowing the oil to be gradually pocketed for the wedging action. Hence, there is no jar due to transmission during the period of acceleration.

When it is desired to start the car inlet port 18 is gradually opened by moving speed lever 24 forward, as indicated by dotted lines in Fig. 2, thus removing sleeve 21 from its position over said inlet port which then allows the oil in case 1 to be drawn through said inlet port by piston plates 34, 35, 36 and 37, respectively. Inlet port 18 is gradually opened by sleeve 21 and outlet port 20 is simultaneously gradually closed by sleeve 22. This permits propeller shaft 51 to slowly and gradually gain speed and when inlet port 18 is entirely opened outlet port 20 is entirely closed and the oil in case 1 will be pocketed in chambers $a$, $b$, and $c$ thus through flexible wedging hydraulic pressure of the oil between the hub and pistons and the inner walls of piston chamber 11, propeller shaft 51 operatively connected through the clutch 53—54 to spindle 15 is caused to move at the same speed as motor driven shaft 25.

When the device is moving to operate propeller shaft 51 forward clutch gear 52 will occupy the position shown in Fig. 2. When, however, it is desired to obtain the reverse movement of the propeller shaft to operate the car backward instead of forward clutch members 53 and 54 are disengaged and clutch gear 52 is thrown into operative engagement with spur gear 48 by means of reverse lever 57 thereby communicating motion from motor driven shaft 25 through internal gear 45, spur gears 47 and 48 and clutch gear 52 whereby propeller shaft 51 is caused to rotate in reverse direction and cause the wheels of the car to be turned backward instead of forward.

The case is preferably provided with a sufficient quantity of oil so that the operative parts are constantly running in oil and are thus thoroughly lubricated.

It will be readily seen that my invention greatly simplifies the control and operation of an automobile, first, by dispensing with the shifting of gears for the various speeds of the car forward while at the same time allowing a smooth, steady, increasing application of power to the propeller shaft of the car, thereby starting the car without jerks or jars and giving a uniform acceleration of speed from start to maximum speed without the attendant difficulty often encountered in shifting gears to obtain the same result. This is especially desirable in traffic where the speed of the car must vary constantly. Second, because of the possibility of applying the power gradually with this apparatus and without jerk or jar a clutch is unnecessary and may be entirely dispensed with. Third, this mechanism having the inertia of a fly wheel and being connected directly to the crank shaft will answer the purpose of a fly wheel so that the ordinary fly wheel may be dispensed with.

In brief, the driving of a car embodying my invention will be greatly simplified and held in much better control since it dispenses with the necessity of operating the clutch and gear shifts and is controlled by a simple throttling of the apparatus for all speeds forward.

While I have shown and described my novel transmission mechanism as adapted and intended for a particular type of conveyance it may also be used in any other situation to which it is adapted and while I have shown and described a particular construction of mechanism it will be understood that it may be varied in construction and arrangement and also comprises the process illustrated and described without departing from the scope or spirit thereof as defined in the claims.

What I claim as new and desire to secure by Letters Patent is:

1. In transmission mechanism for automobiles, a casing containing oil, a rotatable cylindrical piston casing therein having integral hollow spindles suitably mounted and having a cylindrical piston chamber and an inlet port and an outlet port leading through said spindles and piston casing, respectively to said piston chamber, sleeves mounted upon said spindles, respectively to close said ports, respectively, and means to move said sleeves simultaneously to open and close said ports, respectively, a motor driven shaft rotatably mounted in said hollow spindles, a hub disposed eccentrically in said chamber, and formed on said motor driven shaft and having a plurality of radial slots therein, guiding means in said piston chamber, a piston plate mounted in each of said slots and having means thereon to engage said guiding means, respectively, and a propeller shaft operatively connected to said rotatable cylindrical casing, substantially as set forth and for the purposes specified.

2. In transmission mechanism for automobiles, a casing containing oil, a rotatable cylindrical piston casing therein having suitably mounted hollow supporting spindles, a cylindrical piston chamber having an inlet port and an outlet port, means to simultaneously open and close said ports, a motor driven shaft rotatably mounted in said hollow spindles, a cylindrical piston hub, disposed eccentrically in said chamber, fixed on said motor driven shaft and having a plurality of radial slots therein, said piston chamber having guide-ways, a piston plate mounted in each of said slots, and rollers on each of said plates adapted to traverse said guide-ways, respectively whereby when said piston plates revolving in said chamber pass said open inlet port the oil will be pocketed between said hub and chamber walls and the respective plates to form flexible hydraulic wedges to cause said rotatable cylindrical piston casing to turn with said motor driven shaft, substantially as set forth and for the purposes specified.

3. In transmission mechanism for automobiles, a casing containing oil, a rotatable cylindrical piston casing therein having a cylindrical piston chamber and having hollow journals leading into said chamber and having an inlet port and an outlet port leading into said chamber, means to simultaneously open and close said ports, a plurality of movable pistons in said piston chamber spaced apart from each other and adapted to form a series of pockets therebetween and a source of power communicating with and revolving said pistons concentric of said chamber and eccentrically of said source of power whereby a series of flexible hydraulic oil wedges are formed therein to cause said casing to revolve with said pistons, a propeller shaft, and means for connecting said propeller shaft to said rotatable cylindrical piston casing, substantially as set forth and for the purposes specified.

4. In transmission mechanism for automobiles, a casing containing oil, a rotatable cylindrical piston casing therein having hollow supporting spindles and having a removable head, said casing having a cylindrical piston chamber therein and having an inlet port and an outlet port, means to simultaneously open and close said ports, a motor driven shaft rotatably mounted in said spindles, a cylindrical piston hub on said motor driven shaft mounted in said piston chamber eccentrically thereof, said piston hub having a plurality of radial slots therein, and said chamber having guide-ways, a piston plate mounted in each slot and adapted to slide radially therein, guiding means on each of said plates adapted to engage said guide-ways, respectively, whereby when said piston plates revolve therein past said open inlet port the oil will pocket between said hub and chamber walls and the respective plates to form flexible hydraulic wedges to cause said casing to turn with said motor driven shaft, substantially as set forth and for the purposes specified.

5. In transmission mechanism for automobiles, a casing containing oil, a rotatable cylindrical piston casing therein having hollow supporting spindles and having a cylindrical piston chamber and an inlet port and an outlet port leading through said spindles and rotatable cylindrical piston casing, respectively, into said piston chamber, sleeves mounted upon said spindles, respectively, to close said ports, respectively, a yoke to which said sleeves are attached, a speed lever attached to said yoke whereby said sleeves may be simultaneously moved to open and close said ports, respectively, a motor driven shaft rotatably mounted in said hollow spindles, a hub, disposed eccentrically in said chamber, and formed on said motor driven shaft, and having a plurality of radial slots, guiding means in said piston chamber, a piston plate mounted in each of said slots and having means thereon to engage said guiding means, respectively, a propeller shaft and means to operatively connect said propeller shaft and said casing, substantially as set forth and for the purposes specified.

6. In transmission mechanism for automobiles, a casing containing oil, a rotatable cylindrical piston casing therein having a cylindrical piston chamber and having hollow journals leading into said chamber and having an inlet port and an outlet port leading into said chamber, means to simultaneously open and close said ports, a movable piston in said piston chamber and adapted to form a pocket in said piston chamber and a source of power communicating with and revolving said piston concentric of said chamber whereby a flexible hydraulic oil wedge is formed therein and adapted to cause said casing to revolve with said piston, substantially as set forth and for the purposes specified.

JOHN W. GORDON.